July 1, 1924.

H. D. OXLEY 1,500,096

CONTINUOUS BRINE PURIFIER

Filed Feb. 2, 1924  2 Sheets—Sheet 1

Inventor:
Herbert D. Oxley
by Albert Scheible
Attorney

July 1, 1924.
H. D. OXLEY
1,500,096
CONTINUOUS BRINE PURIFIER
Filed Feb. 2, 1924  2 Sheets-Sheet 2
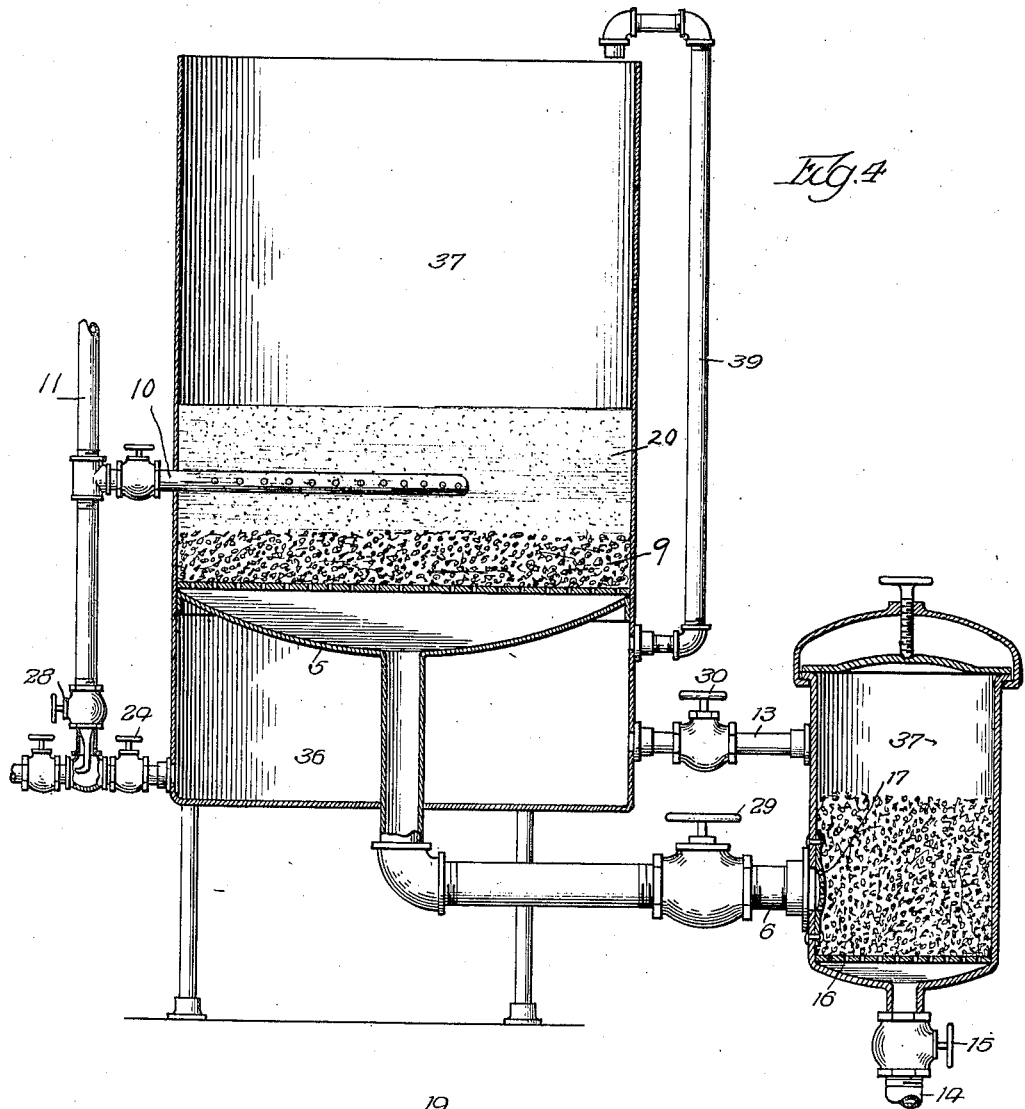
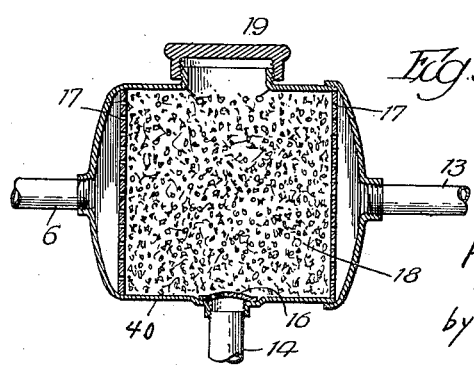
Inventor:
Herbert D. Oxley
by Albert Scheible
Attorney Patented July 1, 1924.

1,500,096

UNITED STATES PATENT OFFICE.

HERBERT D. OXLEY, OF CHICAGO, ILLINOIS.

CONTINUOUS BRINE PURIFIER.

Application filed February 2, 1924. Serial No. 690,146.

*To all whom it may concern:*

Be it known that I, HERBERT D. OXLEY, citizen of the United States, residing at Chicago, Illinois, have invented certain new and useful Improvements in a Continuous Brine Purifier; and I do hereby declare the following to be a full, clear, and exact description of the invention, such as will enable others skilled in the art to which it appertains to make and use the same.

My invention relates to methods and means for economically obtaining purified salt solutions, such as solutions of brine, and desirably for securing a continuous supply of such a salt solution.

In using salt solutions for many purposes, it is highly important that the insoluble portions of the initial supply of salt should be removed from the solution which is to be used. For example, in employing brine for regenerating the active material which is used in water softening apparatus, impurities in the brine must be avoided, as their presence will lead to serious difficulties both by contaminating the softened water and by intermingling with the said active material so as to spoil the proper operative condition of the latter. For this reason, various grades of evaporated salt have heretofore commonly been employed in the reconditioning of the active material used in water softening apparatus, it having been found impractical for the above reasons to employ the much cheaper rock salt although the percentage of impurities in the rock salt available from certain sources is quite low. Apparatus has been devised and tried for purifying some of the grades of salt which are intermediate in price, but even such apparatus has furnished only a partial solution of the problem, owing to the difficulty of eliminating the impurities after these have been separated from the same.

My present invention aims to overcome these last named difficulties and aims to provide a method and apparatus which can readily be employed even in connection with low priced salts (such as rock salt) for obtaining a purified brine solution. Furthermore, my invention aims to provide methods and means for this purpose which will permit of an easy and speedy removal of the collected impurities from the apparatus without introducing any considerable loss of the brine or salt; which will simplify the obtaining of a saturated clear brine solution and the diluting of the latter to any desired degree; which will readily permit the available amount of such a purified and saturated brine solution to be ascertained at a glance; and which will permit a continuous operation of the brine dissolving purifying and diluting apparatus with almost no attention on the part of the operator.

More particularly, my invention provides an apparatus employing gravity for forcing the water or other solvent through a layer of the desired salt superposed on a granular filtering material (such as gravel), provides simple and easily operated means for flushing the accumulated impurities out of this filtering material, provides convenient means for storing the resulting purified brine solution and for diluting the latter to any desired extent, provides easily adjusted control means for permitting the apparatus to be operated to produce a brine solution continuously, and provides simple means for returning any over-supply of the purified brine to the solvent. It also provides means for introducing the supply of fresh water through the bed of salt so as to agitate the salt and to expedite the dissolving of the salt while the water is working upward through the salt. Furthermore, it provides means disposed above the granular filtering material for flushing the latter and desirably employs the same water inlet pipe both for normally introducing water through the salt to dissolve the latter and for occasionally flushing sediment out of the gravel.

Moreover, my invention provides an apparatus in which ordinary gravel serves effectively for supporting the salt, provides simple means disposed considerably below this gravel for catching such sediment as may pass through the gravel with the brine, provides means for withdrawing the resulting purified brine upwardly so as not to carry such sediment further with it, and provides simple means for diluting the concentrated brine to any desired extent. Generally speaking, my invention also provides an apparatus which can readily be installed as a unit and which will be highly efficient even when operated by inexperienced parties. Still further and also more detailed objects will appear from the following specification and from the accompanying drawings. In these drawings, Fig. 1 is a partially sectioned perspective view of an apparatus embodying my invention and employing a purified brine container constructed separately from the dissolving tank, this tank being shown as empty but with dotted lines indicating normal initial levels of the gravel and of the salt supported by the gravel.

Fig. 3 is an enlarged central and vertical section through the sump or sediment catching portion of the apparatus as operatively interposed between the dissolving tank and the purified brine container.

Fig. 4 is a vertical section through another embodiment of my invention, namely an apparatus in which the purified brine container is constructed integral with the dissolving tank and is arranged for feeding any overflow back into the dissolving tank.

Figure 1:
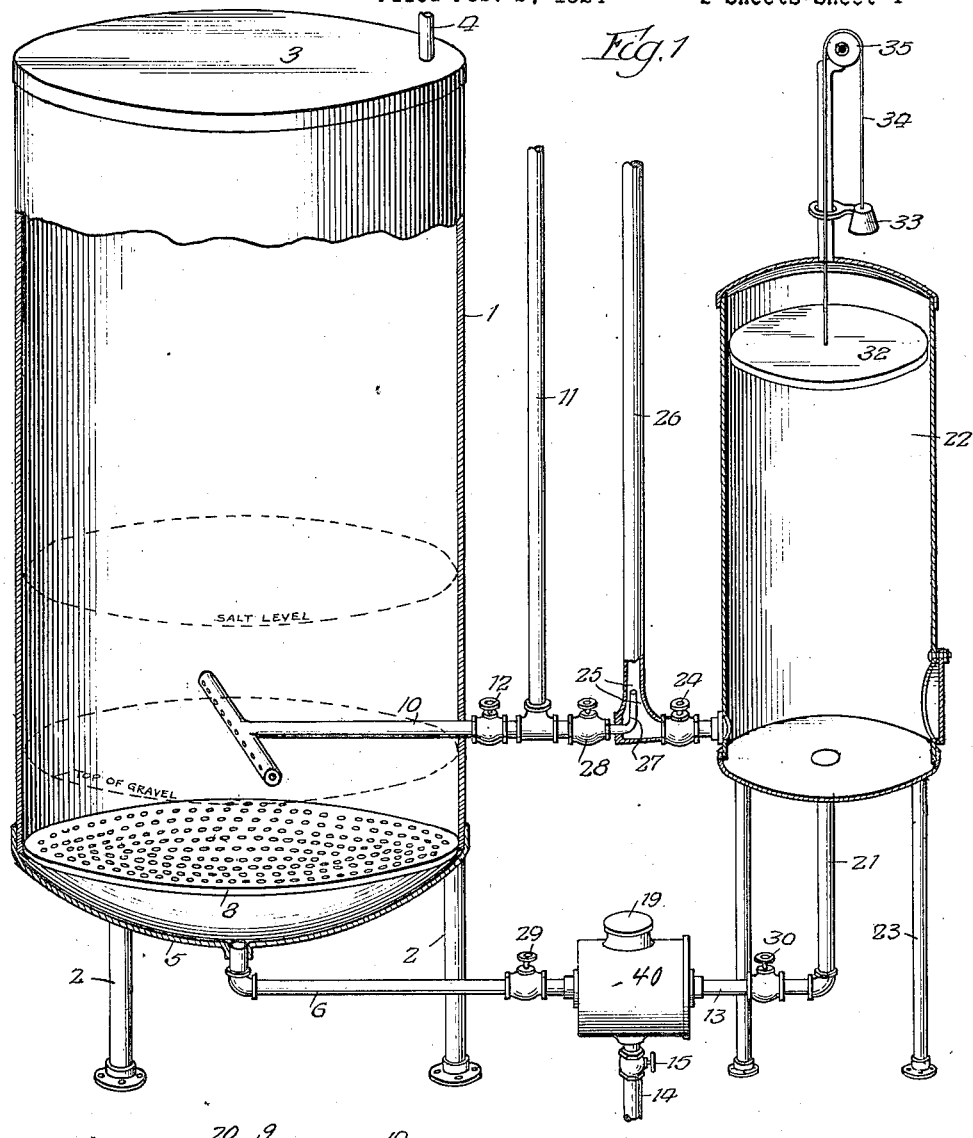
Figure 2:
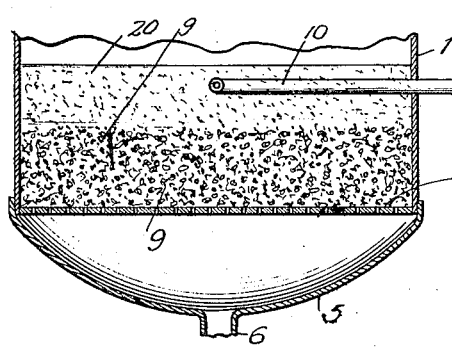
Fig. 2 is a fragmentary central and vertical section through the lower portion of the dissolving tank with a thin bed of salt on the gravel.

Referring first to the embodiment of Fig. 1, this shows a vertical dissolving tank 1 supported above the floor by suitable legs 2 and closed at its upper end by a top 3 through which an air vent pipe 4 extends. The tank has a downwardly convexed bottom 5 provided at its lowermost portion with an outlet leading through a brine pipe 6 to a sump or sediment catcher 40. Within this dissolving tank I provide a foraminous false bottom, such as a flat plate 8 having a large number of perforations of a diameter smaller than that of the stones comprising the gravel 9 which is supported in a thick layer by this plate 8. Extending into the tank somewhat above the top of the gravel is a water pipe 10 which has an outlet portion provided with a large number of lateral openings. This pipe 10 is connected to a fresh water supply pipe 11, the connection between the two being controlled by a hand valve 12 disposed outside the tank.

The sump may be built in a variety of shapes, the form shown in section in Fig. 3 being a drum 40 having the initial brine pipe 6 leading into one vertical head thereof while a purified brine outlet pipe 13 leads from the opposite head of the drum. The drum also has at its bottom a drain outlet 14 controlled by a valve 15, the inlet to this outlet pipe 14 being covered by a perforated plate 16. Within the drum 40 I also provide a pair of perforated screens 17 adjacent to the opposed heads of the drum, the space between these heads being substantially filled with gravel 18. When in use, the screens 16 and 17 prevent the gravel from entering the pipes respectively adjacent to these screens although permitting the free flow of brine through them, while a detachable cover 19 permits access to the interior of the sump for removing or replacing the gravel if this should be deemed necessary, or for flushing accumulated sediment out of this gravel.

In using the apparatus as thus illustrated, a bed of salt 20 is spread over the top of the gravel 9 in the dissolving tank, the gravel being of such a size that it will not readily permit undissolved particles of the salt to pass through the spaces between its particles. The amount of salt thus introduced may be varied as desired, and where my apparatus is to be used for water softening purposes, the size of the dissolving tank and the quantity of salt introduced into it at one time can readily be planned so as to take care of a twenty-four hour supply of the needed brine. In practice, the initial level of the salt preferably is considerably above the water inlet pipe 10, so that water introduced through this pipe will work upward through the salt, thereby agitating the latter and effecting its solution much more speedily than could be done by introducing the water from the top of the tank. For this purpose, I merely open the valve 12 for a sufficient length of time, thereby causing the admitted fresh water to work up through the bed of salt and to fill the portion of the tank above the salt with water which already has some salt dissolved in it. Since salt water has a considerably higher specific gravity than clear water, the portion of the water containing the relatively larger percentage of salt tends to settle in the tank, thereby expediting my securing a concentrated solution of the salt.

While the major and soluble constituents of the original impure salt are thus being dissolved, the insoluble sediment is usually so fine that the greater part of it is carried down with the concentrated brine through the perforated false bottom 8 into the bottom portion 5 of the tank and then through the brine pipe 6 into the sump. In passing through this sump, the brine has to flow through another body of gravel and is drawn through this sump in a generally upward direction, so that the insoluble salt or portions or the sediment which has passed into the sump with the brine will be retained in the latter by gravity. Consequently, only a clear and purified brine passes through the upwardly directed extension 21 of the pure brine pipe 13 into the tank 22 which I provide for storing the concentrated purified brine and which is supported by legs 23 so as to be disposed at a height considerably above the sediment catching sump. Where my apparatus is to be used for reconditioning water in softening apparatus, the brine tank 22 desirably has near its lower end an outlet controlled by a valve 24 and leading through an ejector 25 to a distribution pipe 26 for the diluted brine. This ejector includes a clear water injecting nozzle 27 which is here shown as connected to the same fresh water supply pipe 11 and controlled by a valve 28.

In starting the apparatus, the valves 28 are initially closed, while the valves 29 and 30 which respectively control the inlet and outlet of the sump are open, so that as soon as water is admitted into the dissolving tank by opening the valve 12, gravity will cause the resulting brine to pass down through the sump and then up into the brine container 22 to a gradually increasing height. To indicate this height to the operator, I desirably provide a float 32 within the tank 22, which float will be raised as the level of the concentrated brine increases. By connecting this float through a weight to a cord 34 passing over an elevated pulley 35, I can readily cause the position of the weight to indicate the proportionate amount of brine in the purified brine tank. As soon as the diluted brine is to be used, I open the valves 24 and 28 to an extent in proportion to the desired degree of dilution. When this is done, the apparatus will continue automatically to supply brine of the desired concentration, since the gradual dissolving of the salt in the dissolving tank will replenish the supply of the concentrated brine in the pure brine container 22. When in operation, the suction of the ejector produces a corresponding downward suction through the gravel in the dissolving tank, thereby expediting the dissolving of the salt and causing the supply of brine to be adequately proportioned to the drawing of the concentrated brine from the pure brine container.

In practice, I have found that with readily available grades of rock salt, my apparatus when thus arranged can be employed continuously for long stretches of time for supplying a perfectly clear and uniformly concentrated brine solution, as the two bodies of gravel effectively cooperate in removing this sediment which consists of the relatively small insoluble portions of such rock salt. That is to say, my apparatus does not cause the impurities to accumulate in the lower portion of the salt body, so that a considerable amount of salt has to be removed intermittently and discarded along with these impurities.

However, the water inlet pipe 10 can also be used at any time for flushing the gravel 8 if this should be thought desirable. So also, by closing the valves 29 and 30 and opening the drain valve 15 I can permit the sediment which has accumulated in the sump to pass off through the drain pipe 14, and by removing the cover 19 of the sump I can readily flush the gravel 18 with fresh water for facilitating the removal of the accumulated sediment.

However, while I have heretofore described an embodiment of my apparatus in which the concentrated brine container is built separately from the dissolving tank, and one in which the sump or sediment remover has oppositely disposed heads connected respectively to its inlet and outlet pipe, I do not wish to be limited to these or other details of the construction and arrangement thus disclosed. For example, Fig. 4 shows another embodiment, namely one in which the two tanks are constructed integral with each other. In this case, the pure brine chamber 36 is integral with the dissolving tank 37 and directly below the usual concaved bottom 5 of the latter, while the sump 37 is shown as having its outlet pipe 13 disposed above the sump inlet 6 and leading into one side of the concentrated brine chamber 36. In this construction, I desirably provide a riser pipe 39 extending upwardly from the upper end of the brine chamber 36 and overhanging the upwardly open dissolving tank 37, so that if the amount of concentrated brine produced by the apparatus exceeds the capacity of the chamber 36, the surplus will rise in the pipe 39 and overflow into the dissolving tank.

With either of illustrated forms of apparatus, it will be obvious that the same can readily be installed as an entirety, and it will also be obvious that the method of operation is the same in each case.

I claim as my invention:—

1. A purified brine producing apparatus comprising a dissolving tank, a perforated gravel support above the bottom thereof, a bed of gravel on the said support for supporting a bed of the undissolved salt, a purified brine container connected to the bottom of the said tank, a sump chamber disposed in the connection between the tank and the purified brine container and below both of the latter, and a filling of gravel in the sump chamber through which the brine must pass in flowing from the tank to the purified brine container.

2. A purified brine producing apparatus comprising a dissolving tank, a perforated gravel support above the bottom thereof, a bed of gravel on the said support for supporting a bed of the undissolved salt, a purified brine container connected to the bottom of the said tank, a sump chamber disposed in the connection between the tank and the purified brine container and below both of the latter, and a filling of gravel in the sump chamber through which the brine must pass in flowing from the tank to the purified brine container, in combination with means for introducing dissolving water into the dissolving tank above the top of the gravel and below the normal top of the said salt bed.

3. A purified brine producing apparatus comprising a dissolving tank, a perforated gravel support above the bottom thereof, a bed of gravel on the said support for supporting a bed of the undissolved salt, a purified brine container connected to the bottom of the said tank, a sump chamber disposed in the connection between the tank and the purified brine container and below both of the latter, and a filling of gravel in the sump chamber through which the brine must pass in flowing from the tank to the purified brine container, in combination with means for introducing dissolving water into the dissolving tank above the top of the gravel and below the normal top of the said salt bed, the said means being so disposed with respect to the top of the gravel as to serve also as a means for flushing the gravel when the tank is empty of water and salt.

4. A purified brine producing apparatus comprising a dissolving tank, a brine container having its bottom lower than that of the said tank, a duct leading from the bottom of the tank to the container, a foraminous false bottom within the tank, a salt-supporting bed of gravel on the false bottom, the gravel being of such a consistency as to prevent the passage of undissolved salt crystals between its particles, a water inlet extending into the tank and opening above and near the top of the gravel bed, and a sediment-catching body of gravel or the like disposed in the duct below the bottom of the container.

5. A purified brine producing apparatus comprising a dissolving tank, a brine container having its bottom lower than that of the said tank, a duct leading from the bottom of the tank to the container, a foraminous false bottom within the tank, a salt-supporting bed of gravel on the false bottom, the gravel being of such a consistency as to prevent the passage of undissolved salt crystals between its particles, a water inlet extending into the tank and opening above and near the top of the gravel bed, and a sediment-catching body of gravel or the like disposed in the duct below the bottom of the container, an ejector connected to the container, and means for supplying fresh water to the ejector so as to dilute the ejected brine and so as to produce a suction for expediting the percolating of water through the salt and the gravel in the dissolving tank.

6. The method of making a purified salt solution which consists in supporting the salt on a layer of gravel, causing water to dissolve the salt and to percolate through the gravel in the form of a brine, causing the resulting brine to pass through another and lower body of gravel, and thereafter forcing the brine upwardly from the last named gravel.

7. The method of obtaining a purified solution of a salt, which consists in supporting the salt upon a bed of gravel, forcing clear water through the salt and the gravel and thereafter through a second body of gravel spaced from the said gravel bed and lower than the latter, and then withdrawing the purified solution upwardly from the said second body of gravel.

8. The method of obtaining a purified solution of a salt, which consists in supporting the salt upon a bed of gravel, forcing water first upwardly and then downwardly through the salt, then downwardly through the bed of gravel and thereafter through a second body of gravel spaced from the said gravel bed and lower than the latter, and then withdrawing the purified solution upwardly from the said second body of gravel.

9. The method of obtaining a purified brine solution which consists in supporting a thick bed of salt within a container on a perforate supporting member, introducing clear water into the tank within the bed of salt so as to force the water upwardly through the salt while filling the tank, then allowing the water to percolate by gravity through the salt and the supporting member so as to dissolve salt particles and carry insoluble sediment downward with it, then filtering out the sediment at a point below the supporting member.

10. The method of obtaining a purified solution of a salt, which consists in supporting the salt upon a bed of gravel, forcing water first upwardly and then downwardly through the salt, then downwardly through the bed of gravel and thereafter through a second body of gravel spaced from the said gravel bed and lower than the latter, and then withdrawing the purified solution upwardly from the said second body of gravel, and intermittently flushing the second body of gravel to remove insoluble sediment therefrom.

11. In an apparatus for producing a purified solution of a salt, a gravel bed for supporting the salt and retaining the insoluble constituents thereof, a second body of gravel disposed below and spaced from the gravel bed, a connection for feeding the brine which percolates through the gravel bed to the second body of gravel, means for withdrawing the resulting purified brine upwardly from the second body of gravel, means for withdrawing impurities downwardly from the second body of gravel, and means for operatively disconnecting the second body of gravel from the feeding connections and the said upward brine withdrawal means during the said downward withdrawal of impurities.

Signed at Chicago, January 30th, 1924.

HERBERT D. OXLEY.